United States Patent
Wang et al.

(10) Patent No.: US 11,928,875 B2
(45) Date of Patent: Mar. 12, 2024

(54) LAYOUT-AWARE, SCALABLE RECOGNITION SYSTEM

(71) Applicant: Microsoft Technology Licensing, LLC, Redmond, WA (US)

(72) Inventors: Yan Wang, Mercer Island, WA (US); Ye Wu, Bothell, WA (US); Arun Sacheti, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 725 days.

(21) Appl. No.: 16/297,388

(22) Filed: Mar. 8, 2019

(65) Prior Publication Data
US 2020/0285878 A1    Sep. 10, 2020

(51) Int. Cl.
*G06F 16/387*    (2019.01)
*G06F 16/31*    (2019.01)
(Continued)

(52) U.S. Cl.
CPC ...... *G06V 30/18171* (2022.01); *G06F 16/313* (2019.01); *G06F 16/35* (2019.01);
(Continued)

(58) Field of Classification Search
CPC .. G06K 2209/01; G06K 9/00442; G06K 9/72; G06K 9/00463; G06K 9/2063;
(Continued)

(56) References Cited

U.S. PATENT DOCUMENTS

| 5,754,938 A | * | 5/1998 | Herz | G06Q 20/383 |
| | | | | 348/E7.056 |
| 8,332,401 B2 | * | 12/2012 | Hull | G06K 9/00463 |
| | | | | 707/736 |

(Continued)

OTHER PUBLICATIONS

Harmon, Automatic Recognition of Print and Script, Oct. 1972 [retrieved Jun. 21, 2020], Proceedings of the IEEE, vol. 60, Issue: 10,pp. 1165-1176. Retrieved: https://ieeexplore.ieee.org/abstract/document/1450808/authors#authors (Year: 1972).*

(Continued)

*Primary Examiner* — Matthew C Bella
*Assistant Examiner* — Dennis Rosario
(74) *Attorney, Agent, or Firm* — Calfee, Halter & Griswold LLP

(57) ABSTRACT

Described herein is a mechanism for visual recognition of items or visual search using Optical Character Recognition (OCR) of text in images. Recognized OCR blocks in an image comprise position information and recognized text. The embodiments utilize a location-aware feature vector created using the position and recognized information in each recognized block. The location-aware features of the feature vector utilize position information associated with the block to calculate a weight for the block. The recognized text is used to construct a tri-character gram frequency, inverse document frequency (TGF-IDP) metric using tri-character grams extracted from the recognized text. Features in location-aware feature vector for the block are computed by multiplying the weight and the corresponding TGF-IDF metric. The location-aware feature vector for the image is the sum of the location-aware feature vectors for the individual blocks.

20 Claims, 9 Drawing Sheets

(51) Int. Cl.

| | |
|---|---|
| *G06F 16/35* | (2019.01) |
| *G06F 18/2411* | (2023.01) |
| *G06N 20/10* | (2019.01) |
| *G06V 10/70* | (2022.01) |
| *G06V 10/75* | (2022.01) |
| *G06V 10/80* | (2022.01) |
| *G06V 20/62* | (2022.01) |
| *G06V 30/144* | (2022.01) |
| *G06V 30/148* | (2022.01) |
| *G06V 30/18* | (2022.01) |
| *G06V 30/19* | (2022.01) |
| *G06V 30/413* | (2022.01) |
| *G06V 30/414* | (2022.01) |
| *G06V 30/10* | (2022.01) |

(52) U.S. Cl.
CPC ........ *G06F 16/387* (2019.01); *G06F 18/2411* (2023.01); *G06N 20/10* (2019.01); *G06V 10/70* (2022.01); *G06V 10/75* (2022.01); *G06V 10/806* (2022.01); *G06V 20/62* (2022.01); *G06V 30/144* (2022.01); *G06V 30/153* (2022.01); *G06V 30/158* (2022.01); *G06V 30/1916* (2022.01); *G06V 30/19173* (2022.01); *G06V 30/413* (2022.01); *G06V 30/414* (2022.01); *G06V 30/10* (2022.01)

(58) Field of Classification Search
CPC .... G06K 9/00; G06K 9/2054; G06K 9/00483; G06K 9/344; G06K 9/00449; G06K 9/00288; G06K 9/6282; G06K 9/6267; G06K 9/00456; G06K 9/325; G06K 9/348; G06F 16/93; G06F 16/951; G06F 40/174; G06F 16/332; G06F 16/41; G06F 40/14; G06F 16/316; G06F 16/30; G06F 16/334; G06F 16/00; G06F 40/10; G06F 16/24578; G06F 16/5846; G06F 40/279; G06F 16/51; G06F 16/583; G06F 16/2228; G06F 16/285; G06F 16/3347; G06F 16/31; G06F 16/901; G06F 16/22; G06F 16/3344; G06F 16/33; G06F 16/313; G06F 16/38; G06F 16/2445; G06F 16/80; G06F 16/75; G06F 16/743; G06F 16/78; G06F 16/7867; G06F 16/787; G06F 16/90; G06F 16/906; G06F 16/907; G06F 16/909; G06F 16/95; G06F 16/9537; G06F 16/986; G06F 16/972; G06F 16/10; G06F 16/13; G06F 16/134; G06F 16/14; G06F 16/148; G06F 16/152; G06F 16/156; G06F 16/16; G06F 16/164; G06F 16/166; G06F 16/168; G06F 16/17; G06F 16/172; G06F 16/1724; G06F 16/1727; G06F 16/173; G06F 16/1734; G06F 16/174; G06F 16/1744; G06F 16/1748; G06F 16/1752; G06F 16/1756; G06F 16/176; G06F 16/1774; G06F 16/178; G06F 16/1787; G06F 16/1794; G06F 16/18; G06F 16/1805; G06F 16/182; G06F 16/183; G06F 16/184; G06F 16/1844; G06F 16/185; G06F 16/1858; G06F 16/865; G06F 16/1873; G06F 16/188; G06F 16/196; G06F 16/45; G06F 16/438; G06F 16/48; G06F 16/487; G06F 16/538; G06F 16/55; G06F 16/58; G06F 16/587; G06F 16/61; G06F 16/638; G06F 16/68; G06F 16/687; G06F 16/71; G06F 16/738; G06F 16/7844; G06F 18/00; G06F 40/103; G06F 40/106; G06F 40/12; G06F 40/126; G06F 40/295; G06F 40/53; G06F 16/387; G06F 16/65; G06T 2207/20084; G06N 3/08; G06N 20/00; G06N 3/02; G06N 3/0464; G06V 10/70; G06V 10/764; G06V 10/765; G06V 10/82; G06V 30/00; G06V 30/10; G06V 30/1444; G06V 30/1448; G06V 30/1452; G06V 30/1456; G06V 30/1468; G06V 30/1465; G06V 30/147; G06V 30/1475; G06V 30/1478; G06V 30/153; G06V 30/40; G06V 30/413; G06V 30/414; G06V 30/416; G06V 30/412; G06V 30/41; G06V 30/418; G06V 30/42; G06V 30/422; G06V 30/424; G06V 20/62; G06V 20/63; G06V 20/625; G06V 20/635; G06V 30/18; G06V 30/19113; G06V 30/19173; G06V 30/36

See application file for complete search history.

(56) References Cited

U.S. PATENT DOCUMENTS

| | | | |
|---|---|---|---|
| 2012/0209853 A1* | 8/2012 | Desai | G06F 16/3344 707/E17.014 |
| 2018/0129944 A1* | 5/2018 | Meunier | G06N 20/00 |
| 2019/0108486 A1* | 4/2019 | Jain | G06Q 10/107 |
| 2019/0370387 A1* | 12/2019 | Cao | G16H 50/20 |

OTHER PUBLICATIONS

Christy et al., Mass Digitization of Early Modern Texts With Optical Character Recognition, Dec. 2017 [retrieved Oct. 6, 2023], ACM Journal on Computing and Cultural Heritage, vol. 11, No. 1, Article 6, 25 pages. Retrieved: https://dl.acm.org/doi/abs/10.1145/3075645 (Year: 2017).*

* cited by examiner

LAYOUT-AWARE, SCALABLE RECOGNITION SYSTEM

FIELD

This application relates generally to recognition systems. More specifically, this application relates to improvements in recognition systems that utilize optical character recognition as part of the recognition process.

BACKGROUND

Recognition systems, such as visual search systems, visual recognition systems, and so forth utilize images to retrieve search results, provide information about the image, and so forth. Advances in deep machine learning have improved the accuracy and utility of these systems, but problems still remain.

Some systems use optical character recognition (OCR) as part of the recognition process. However, traditional approaches to OCR leave much to be desired when used as part of a recognition system. OCR output tends to be very "noisy" in that characters, words, and other textual items in the image can be mis-recognized. Current systems lack the ability to deal with such noisy output in a robust manner.

It is within this context that the present embodiments arise.

DETAILED DESCRIPTION

Figure 1:
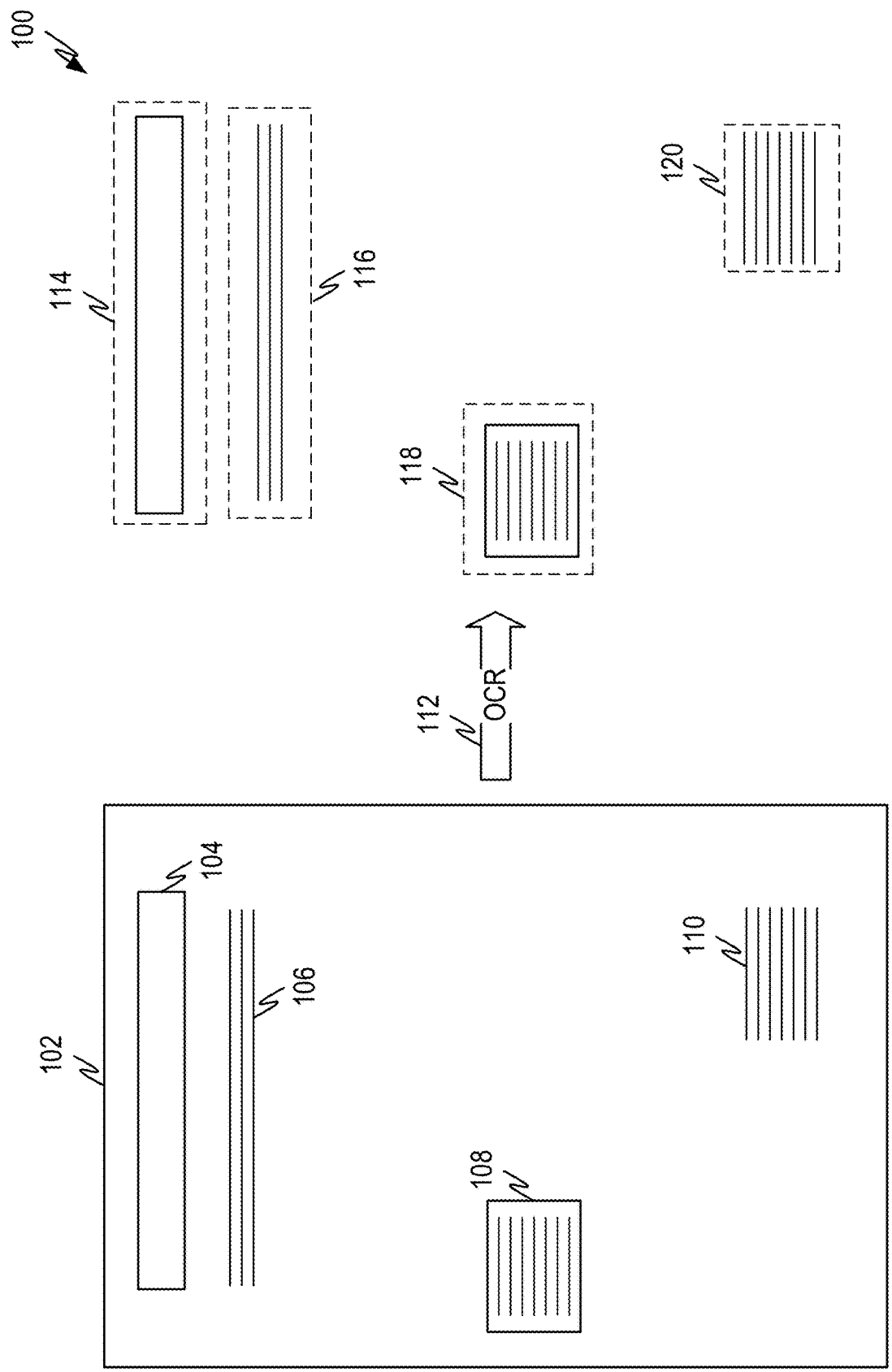
FIG. 1 illustrates an example illustrating optical character recognition output.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Optical Character Recognition (OCR) plays a large role in visual search and visual recognition systems (collectively referred to herein as recognition systems). While many approaches to recognition systems use various machine learning mechanisms, a lot of recognition still depends on text in the source image. Examples include book recognition, product recognition, image recognition, visual search, and other electronic recognition systems. These recognition systems can bring considerable business value and can be used in a variety of contexts such as question and answer systems, visual search, visual recognition, and any other system where an electronically recognized item can be further processed, such as automated checkout systems and so forth. In general, these recognition systems first run OCR on the input image, and then further process the image content and/or the OCR text to generate the final recognition results.

While text understanding and Natural Language Processing (NLP) are mature areas that have been well researched. OCR-specific text features are still an under-explored topic. Most text understanding or NLP algorithms assume the input is a linear text stream, e.g. a document. However, the output of OCR is a set of text blocks, with location and size information for each block. A straightforward way of applying existing algorithms on OCR outputs may be concatenating the OCR texts as if they are from a single document, and then run the text understanding algorithm on it. This approach discards the rich layout information from the OCR output, and usually results in degenerated performance.

Another challenge of recognition systems comes from the noise of OCR output. Query images in the wild have all kinds of imperfections: reflection, motion blur, dark regions, sensor noise, imperfect focus, and other such imperfections. These can and do affect the OCR algorithm resulting in a "noisy" output that can be full of errors, such as missing or misspelled words, misrecognized characters, and so forth. Achieving good recognition accuracy based on these imperfect OCR results is challenging.

Embodiments disclosed herein utilize a recognition approach based on a novel layout-aware text feature to solve the aforementioned challenges. Instead of doing exact word match, the feature uses 3-letter-grams to gain robustness against spelling errors and other misrecognitions. In addition to the text content, the feature also uses the 2D layout of the OCR output. Special normalization and matching schemes are also utilized to solve the imbalanced cross-domain retrieval problem.

From a machine learning perspective, a recognition system can be formulated as a classification problem or a retrieval problem. In real world application scenarios, a system may need to recognize millions of products, books, and or other items. Embodiments disclosed herein utilize a retrieval approach because:

A million-class classifier would be extremely hard to train and serve, especially considering the memory requirement for most popular classifiers including SVM, random forest, and neural networks. On the other hand, retrieval engines are able to scale up to billions of documents.

When the training examples (or databases/indexes in the retrieval case) get updated, the classifier generally requires retraining or, at a minimum, online updating of classification model parameters, which is either time consuming or complicated. However, retrieval engines do not have this problem and can work with updated databases/indexes without modification.

In this disclosure the term "a retrieval engine," refers to the retrieval process that powers the recognition system.

Description

Embodiments of the present disclosure can apply to a wide variety of systems whenever machine recognition comprises textual clues in the source image. Example systems in which embodiments of the present disclosure can apply include, but are not limited to, visual search systems, visual recognition systems, and any system where automated recognition of an item can be used to drive further processing such as an automated checkout system. All these are collectively referred to as recognition systems herein.

OCR Process and Recognized Blocks

FIG. 1 illustrates an example 100 illustrating optical character recognition output. An input image (also referred to herein as a document) 102 has areas 104, 106, 108, 110 that can be recognized by an OCR process 112. These areas contain textual information. The textual information in each area 104, 106, 108, 110 can have a different font size, different line spacing, and other textual characteristics. An OCR process 112 recognizes these areas 104, 106, 108, 110 and produces recognized text blocks 114, 116, 118, 120. Each block has a number of characteristics associated with it and can be expressed as $\{(x_i, y_i, w_i, h_i), text_i\}$. In this representation, $x_i$, $y_i$, $w_i$, $h_i$ are referred to herein as positional properties and represent the left coordinate, top coordinate, width, and height of the block, respectively text; is the recognized text for the block. As noted herein, the quality of the image 102 can greatly affect the accuracy of the text recognition. Images captured under good lighting conditions, with a "face on" camera angle, good focus, and so forth can result in good recognition. However, images captured under less than ideal conditions tend to have shadows, blurry areas, challenging camera angles, and other factors that can lead to less than accurate text recognition. Thus, misrecognized characters, words, and so forth are common in the various blocks 114, 116, 118, 120.

Prior art solutions discard the positional properties, $x_i$, $y_i$, $w_i$, $h_i$, and utilize only the recognized textual information. Embodiments of the present disclosure, however, make use of the positional properties as described herein.

As previously discussed, from a machine learning perspective, a recognition system can be formulated as a classification problem or a retrieval problem. As a practical matter, systems that take the classification approach are limited in the number of classes they can recognize.

Embodiments of the present disclosure take the retrieval approach because, among other things:

A million-class classifier would be extremely hard to train and serve, especially considering the memory requirement for most popular classifiers including SVM, random forest, and neural networks. On the other hand, retrieval engines are able to scale up to billions of documents.

When the training examples (or databases/indexes in the retrieval case) get updated, the classifier generally requires retraining or, at a minimum, online updating of classification model parameters, which is either time consuming or complicated. However, retrieval engines do not have this problem and can work with updated databases/indexes without modification.

The feature extraction mechanisms disclosed herein can be pail of a variety of different recognition systems. The next several figures will provide example contexts where the disclosed feature extraction mechanisms can be used. The contexts, however, are only exemplary and other contexts exist where the feature extraction mechanisms can be used to drive retrieval and other recognition processes.

Example Retrieval Systems

Figure 2:
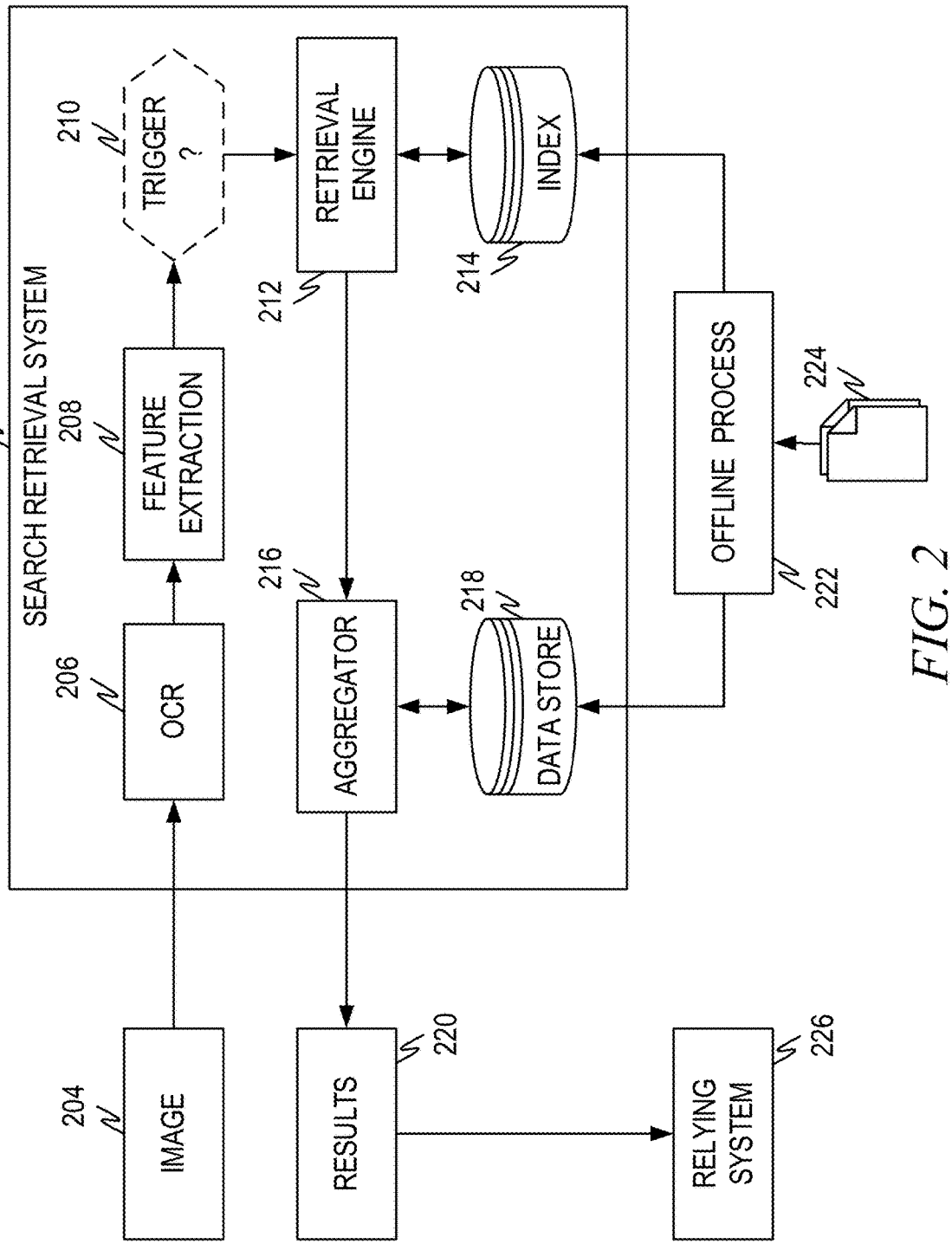
FIG. 2 illustrates an example architecture for visual search according to some aspects of the present disclosure.

FIG. 2 illustrates an example architecture 200 for an example search retrieval system such as a visual search system according to some aspects of the present disclosure. In the example architecture, the various processes are described as part of the search retrieval system 202, although in other embodiments one or more of the described processes may exist independently of the search retrieval system 202 and be provided by other systems.

An image 204 is presented to the search retrieval system 202. The image undergoes an OCR process 206, such as that described in FIG. 1, and the recognized blocks are extracted from the image 204. As noted above, each recognized block contains positional properties $(x_i, y_i, w_i, h_i)$ as well as recognized text ($text_i$). The recognized blocks are input into a feature extraction process 208, described in greater detail below, which extracts a feature vector representative of the image 204.

An optional trigger process 210, described in greater detail below, can be used to determine if the retrieval engine 212 should be engaged to retrieve results based on the query feature vector and/or to suppress results that are uncertain. In one example, the trigger process 210 can ascertain whether the query feature vector is representative of the types of information that retrieval engine 212 can obtain search results for. For example, if the search retrieval system 202 was limited to retrieving search results for a particular set of categories of information, the trigger process 210 can ascertain whether the feature vector falls into a category of the set, and if so, engage the retrieval engine 212. If not, other actions can be taken, such as informing the user that results are not available, passing the feature vector to another retrieval engine that serves the identified category, and so forth.

Retrieval engine 212 can retrieve search results from a search index 214 or other data store. Retrieval engines 212 are well known and any of can be used with the embodiments of the present disclosure. A representative retrieval process more tailored to the feature vectors used herein is also described in greater detail below.

Once a set of search results are identified by retrieval engine 212, an aggregator process 216 can retrieve additional metadata and other information from a data store 218.

The additional information is related to the results and aggregated with the search results by the aggregator process 216.

The final results 220 can be returned to the user and/or provided to additional systems 226 so they can make further use of the results. For example, suppose image 204 is of a product. The search retrieval system 202 can identify the product(s) in the image. The results 220 can contain the identity of the product(s), locations on where to purchase the product(s), additional information such as directions for use, links to actually purchase the product, and so forth. The relying system 226 can present this information to a user and take further action based on user choices.

In order to create the search index 214 and/or data store 218, an offline process 222 can be used. A representative offline process is described in greater detail below. In summary, the offline process 222 takes input documents 224 and creates the index 214 and/or data store 218 that are used by the search retrieval system 202.

Figure 3:
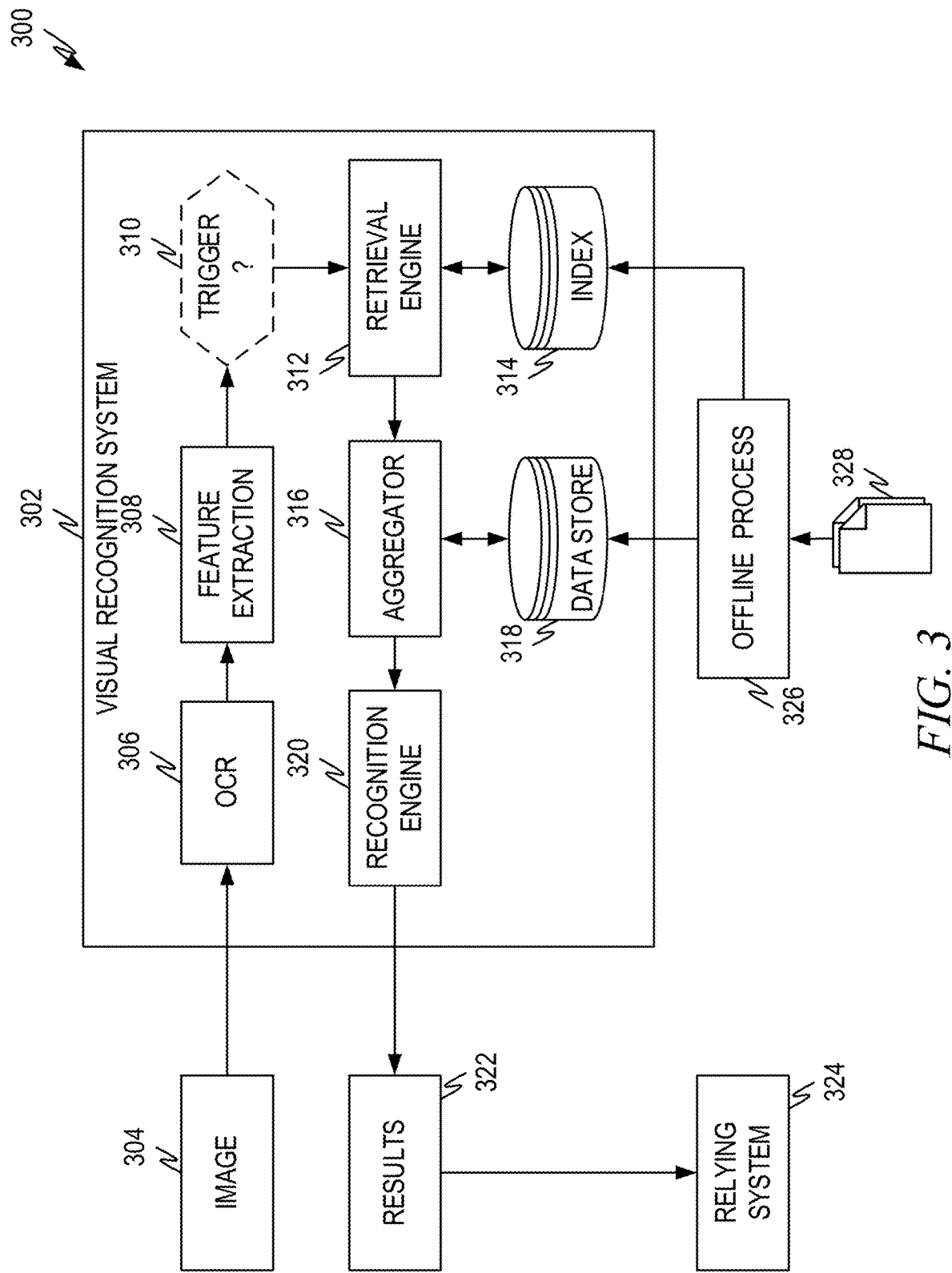
FIG. 3 illustrates an example architecture for visual recognition according to some aspects of the present disclosure.

FIG. 3 illustrates an example architecture 300 for visual recognition according to some aspects of the present disclosure. This system is very similar to the search retrieval system of FIG. 2. Rather than being focused on retrieving search results and aggregating the information, the recognition system 302 transforms the search results into recognition results as indicated.

An image 304 is presented to the visual recognition system 302. The image undergoes an OCR process 306, such as that described in FIG. 1, and the recognized blocks are extracted from the image 304. As noted above, each recognized block contains positional properties ($x_i$, $y_i$, $w_i$, $h_i$) as well as recognized text ($text_i$). The recognized blocks are input into a feature extraction process 308, described in greater detail below, which extracts a feature vector representative of the image 304.

An optional trigger process 310, described in greater detail below, can be used to determine if the retrieval engine 312 should be engaged to retrieve results based on the feature vector and/or whether uncertain results should be suppressed. For example, trigger process 310 can ascertain whether the feature vector is representative of the types of information that retrieval engine 312 can obtain search results for. For example, if the visual recognition system 302 was limited to recognizing items in a particular set of categories of information, the trigger process 310 can ascertain whether the query feature vector falls into a category of the set, and if so, engage the retrieval engine 312. If not, other actions can be taken, such as informing the user that results are not available, passing the feature vector to another system that serves the identified category, and so forth.

Retrieval engine 312 can retrieve search results from a search index 314 or other data store. Retrieval engines 312 are well known and any of can be used with the embodiments of the present disclosure. A representative retrieval process more tailored to the feature vectors used herein is also described in greater detail below.

Once a set of search results are identified by retrieval engine 312, an aggregator process 316 can retrieve additional metadata and other information from a data store 318. The additional information is related to the results and aggregated with the search results by the aggregator process 316.

Recognition engine 320 transforms the search results into recognition results through a desired process. Search results comprise a variety of information related to the feature vector and can include a wide variety of information that is related to an item being recognized. Recognition results comprise, for example, the identity of the item being recognized. There are numerous ways that search results, recognition engine 320 can utilize a trained machine learning model that converts the search results to recognition results. As another alternative, majority voting logic can be used to convert search results into recognition results. Majority voting takes into account items associated with the search result and identifies the most likely item based on what item the majority relates to.

The results 322 can be returned to the user, and/or presented to further systems 324 to perform additional functions. As an example, the recognition system can identify the product(s) and the relying system can be an automated checkout system, such as a kiosk in a store, or other such system. It is clear that once a product is recognized that any number of systems can make use of that information in a variety of scenarios.

In order to create the search index 314 and/or data store 318, an offline process 326 can be used. Although a representative offline process is described in greater detail below, in summary, the offline process 326 takes input documents 328 and creates the index 314 and/or data store 318 that are used by the visual recognition system 302.

Search Index Building

Figure 4:
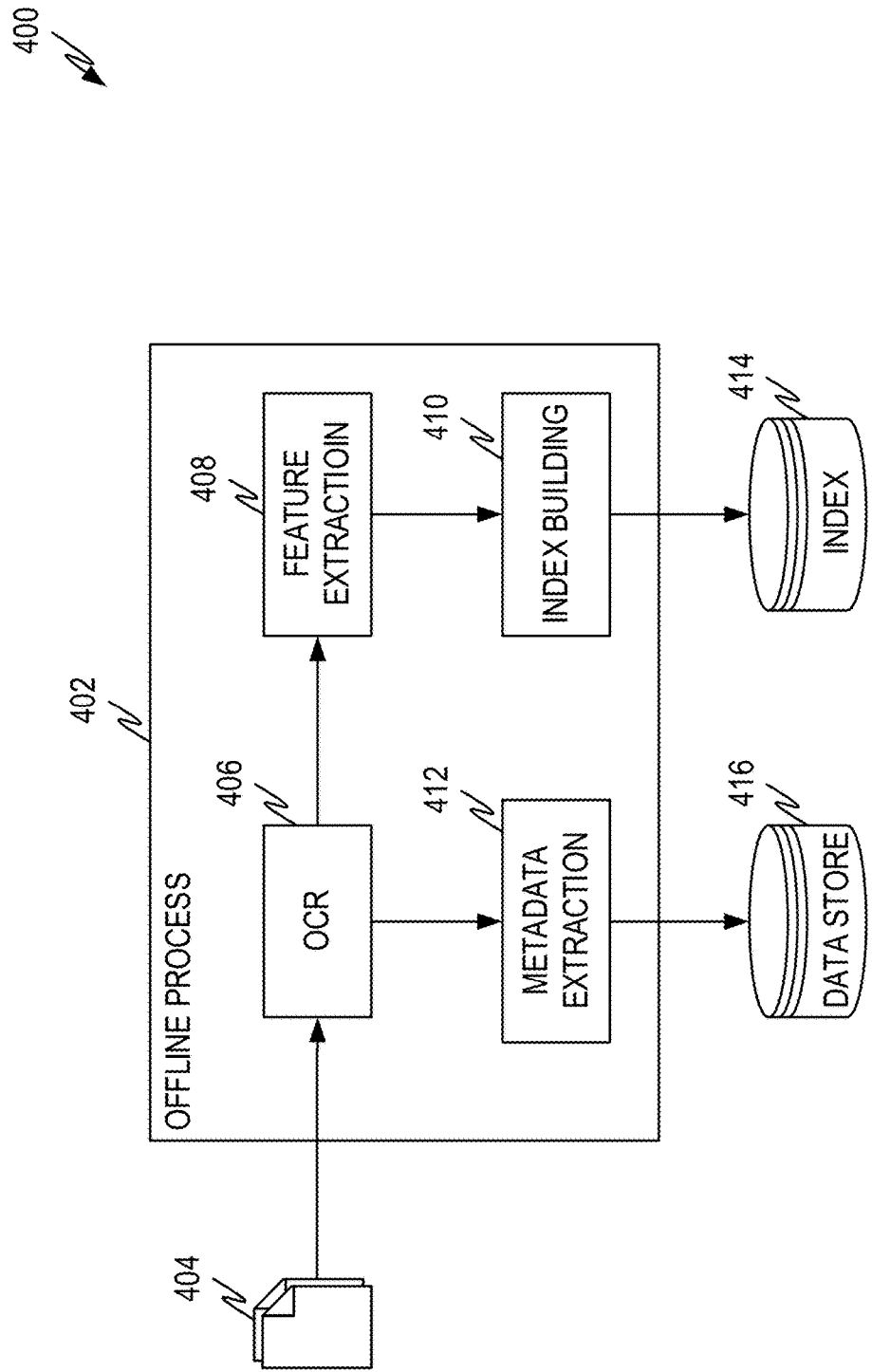
FIG. 4 illustrates a representative architecture for index building and metadata gathering according to some aspects of the present disclosure.

FIG. 4 illustrates a representative architecture 400 for index building and metadata gathering according to some aspects of the present disclosure. Thus, FIG. 4 illustrates a representative example of how an offline process 222, 326 can be implemented.

The representative offline process 402 receives a set of input documents 404. The input documents 404 represent images with text boxes that can be recognized, for example, using an OCR process 406. The output of the OCR process 406 are the recognized boxes comprising the positional properties and recognized text as previously described. Typically, the corpus of documents 404 will include, but are not necessarily limited to, images with good lighting, camera angles, and so forth. This can increase the OCR accuracy for such images. In some instances, the corpus 404 can contain images "taken in the wild" under less than ideal circumstances as well. The effect of having better images to create the search index 414 and poorer images as query images is discussed in greater detail below.

Each document in the corpus 404 is put through the OCR process 406 and the resulting recognized boxes are input into a feature extraction process 408, which produces a feature vector for the document under consideration. This feature extraction process 408 can be the same feature extraction process used in corresponding embodiments (e.g., 208, 308) or can have some differences. However, using the same feature extraction process can increase the accuracy of the resulting index 414 when used in a system. A representative feature extraction process is described in greater detail below.

An index building process 410 creates, modifies, and/or adds to the index 414 to include entries for the documents in the corpus 404. Although the index 414 can include a variety of information, some embodiments of the index 414 comprise feature vectors from which search results can be identified using a query feature vector. Search indexes are well known as is the process to create such indexes and a detailed description need not be given here. However, due to the sparse nature of the index that is created, a inverse index can be effectively used as described in greater detail below.

Embodiments of the present disclosure can utilize layout-aware features for the feature vectors used to build the index 414. Layout-aware features are discussed below. The information in the feature vectors used to create the index 414 will be discussed in at that time.

Metadata extraction process 412 extracts metadata information related to the document under consideration and stores it in data store 416. Such metadata can comprise any additional information associated with the documents 404 and can be extracted from the document itself, from the context of the document, other sources, or any combination thereof. The metadata can be indexed in such a way as to be retrievable based on the identified results from the index 414.

Index 414 is an example of indexes 214 and 314 and data store 416 is an example of data stores 218 and 318.

Triggering Model

A practical problem for a recognition or a retrieval system is, given an image, to tell whether it makes sense to do recognition or retrieval on it. For example, it will not provide much user value to perform a plant recognition on a photo of a dog. Therefore, embodiments that have been previously illustrated can include an optional triggering module as a gating procedure. The proposed layout-aware feature described below enables systems to provide accurate triggering on top of OCR results.

Example triggering systems comprise a single stage triggering system or a two-stage triggering system. A two-stage triggering system can comprise a pre-triggering model and post-triggering model. A pre-triggering model only uses the query itself to quickly determine whether to proceed, while a post-triggering model utilizes the recognition scores (discussed in the retrieval and recognition section below) to determine whether to suppress some or all of the recognition results. For pre-triggering, general supervised learning techniques can be applied to the location-aware feature vector of a query. Given the sparse nature of the feature vector, kernel machines such as Support Vector Machines (SVMs) work well. Training data can include positive and negative training examples and the training data can be used train a classifier on top of the extracted features. A precision-recall curve can be used to further tune the cut-off threshold. In the prediction stage, the query image goes through the same feature extraction pipeline and the trained SVM determines whether to trigger the recognition process or perform some other action. The decision of whether to trigger is made by comparing the prediction score with a threshold. For classifiers on Euclidean distance $L_2$ normalization is often performed for better performance. In practice, it is also common to add visual information to train an ensemble model.

Post-triggering comprises a model based on the calculated top retrieval scores, $S_d$, which are discussed in greater detail in the retrieval and recognition section. Options include a gradient boosting tree model trained on separately collected training data, and rule-based models. The intuition of the post-triggering model is to not return recognition results to the user if the result scores suggest uncertainty about the results.

For a single stage triggering model, only the pre-triggering approach or post-triggering approach is used. For a two-stage triggering model, both are used.

Figure 5:
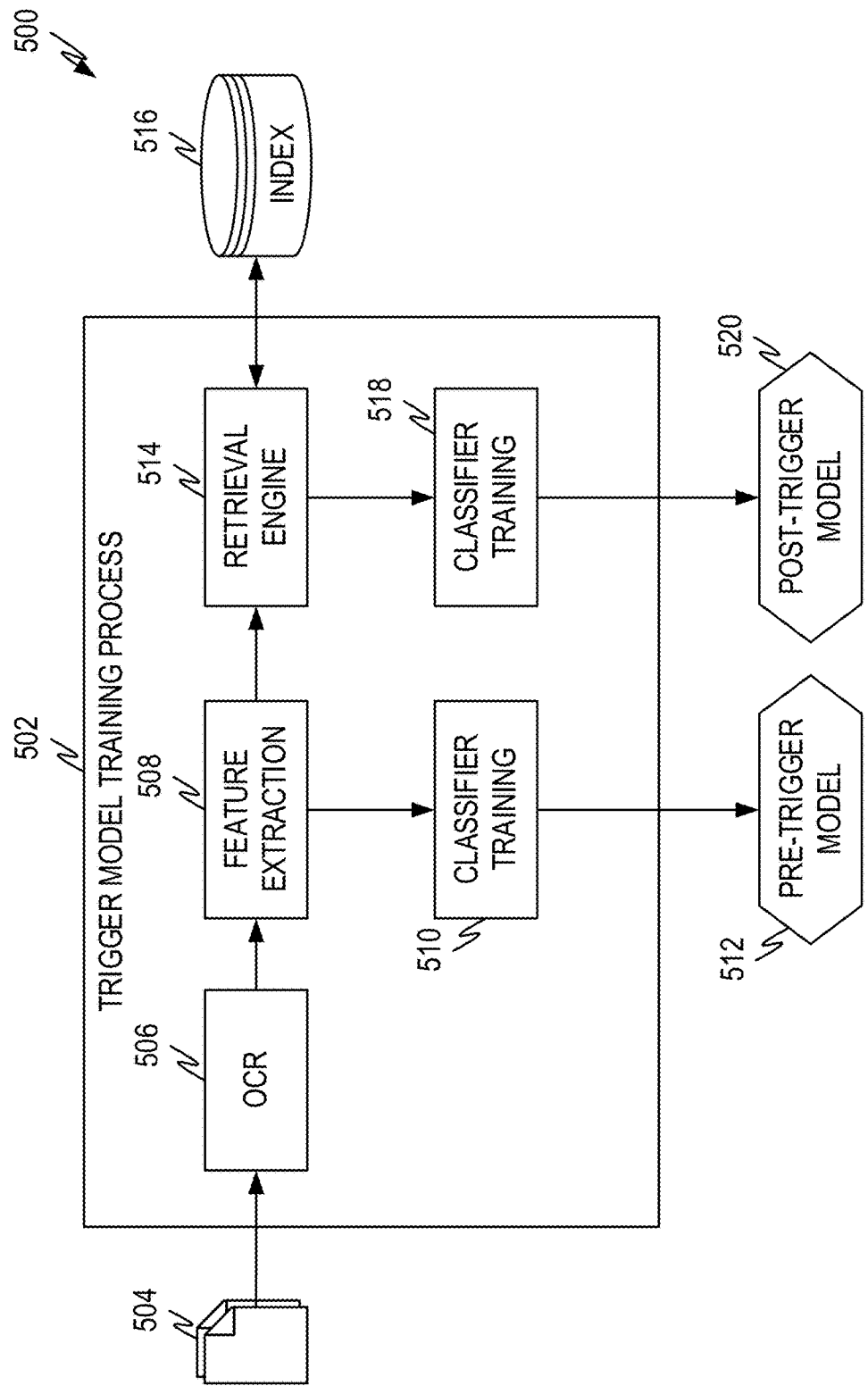
FIG. 5 illustrates a representative architecture for trigger model training according to some aspects of the present disclosure.

FIG. 5 illustrates a representative architecture 500 for trigger model (pre-triggering model and/or post-triggering model) training according to some aspects of the present disclosure. As noted above, the trigger model 512, 520 whether in a single stage or two stage model is not utilized on all embodiments. The trigger model 512, 520 can be used where it is desired to assess whether a given retrieval, classification, or other process should be triggered or when retrieved results should be suppressed as described above. For pre-triggering, the trigger model 512 is a classifier model that ascertains whether a given query image falls into a particular category based on an associated feature vector. For example, if a recognition system only responds to a few categories of items, then the trigger model can identify whether the query image falls into a covered category. If the query image falls into one of a set of categories, the system can be triggered. Otherwise, other actions can be taken as described herein.

For post-triggering, the triggering model 520 is trained using retrieval scores as previously discussed. This includes using a retrieval engine 514 to calculate retrieval scores from index 516 entries as discussed below.

The trigger model 512, 520 is a machine learning classifier. Any number of suitable machine learning classifiers can be utilized. As noted above, Support Vector Machines (SVM) is a good choice for pre-triggering. Alternatively, or additionally, Logistic Regression (LR), Naive-Bayes, Random Forest (RF), neural networks (NN), matrix factorization, and other such models may be used for the trigger model 512, 520. Machine learning classifiers are well known, and the various options need not be further discussed. Any model that can ascertain whether a feature vector corresponds to one of a set of categories can be effectively used for a pre-triggering model 512. Any model that can categories retrieval scores into categories that represent the certainty of results can be effectively used for a post-triggering model 520.

The trigger model training process 502 receives training data 504 in the form of training images. An image under consideration is put through an OCR process 506 as described herein that produces recognized blocks with positional properties along with recognized text as described herein. The feature extraction process 508 extracts a feature vector for the image under consideration. For pre-triggering model 512 the feature vectors for the training data 504 are then used to train the pre-trigger machine learning classifier model 512 using a supervised or unsupervised training process 510. For post-trigger model 520, a retrieval engine 514 is used to calculate retrieval scores for entries in the index as described herein. The retrieval scores are then used to train the post-triggering machine learning classifier model 520 using a supervised or unsupervised training process 518. The training of machine learning models is well known and need not be repeated herein.

Location-Aware Features And Feature Vectors

Figure 6:
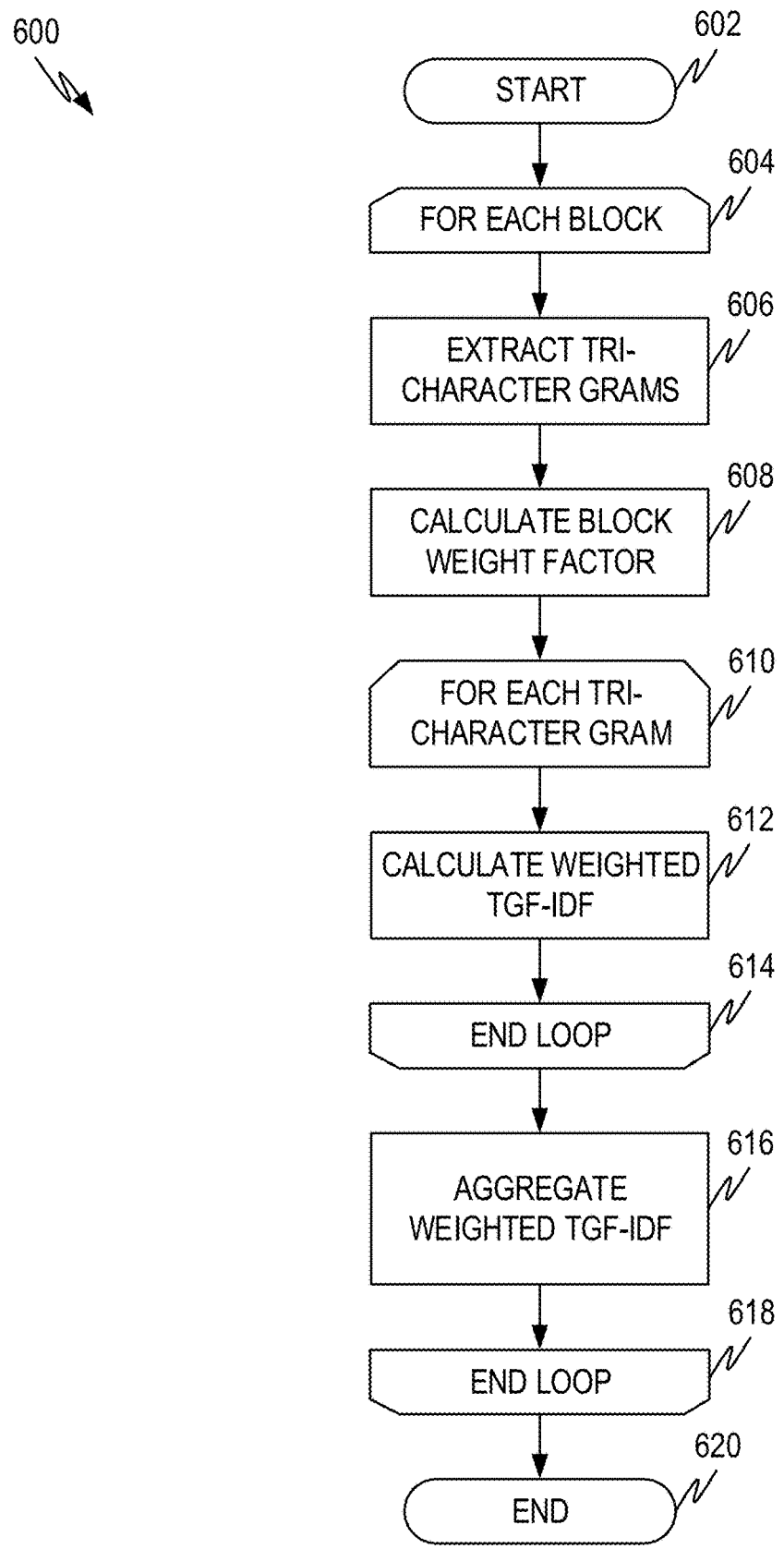
FIG. 6 illustrates a representative flow diagram for feature extraction according to some aspects of the present disclosure.
Figure 7:
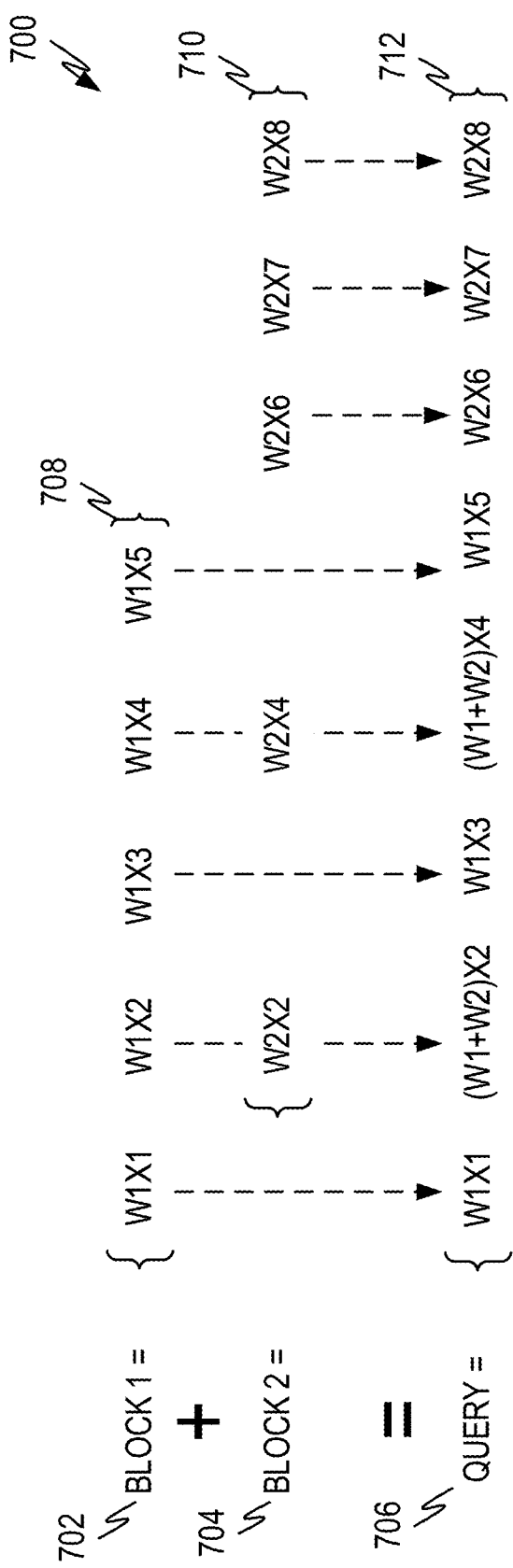
FIG. 7 illustrates a representative diagram showing an example of creating a location-aware feature vector for a document according to some aspects of the present disclosure.

Before discussing feature extraction from a document in conjunction with FIGS. 6 and 7, a discussion of location-aware features used in embodiments of the present disclosure will be presented.

A popular choice for features in recognition and/or machine learning systems that deal with text is TF-IDF or term frequency-inverse document frequency. This feature is a numeric measure that is used to score the importance of a word in a document based on how often it appears in a document and in a collection of documents. However, for the present embodiments, TF-IDF is a poor choice, given the noisy nature of OCR and the frequent occurrence of spelling errors, misrecognized characters, and the other problems described herein. Furthermore, documents in embodiments of the present disclosure do not simply comprise a linear set of terms. Rather, as shown, documents are input into an OCR process from which a set of recognized text blocks are obtained, each recognized text block comprising positional properties and recognized text. Thus, a document comprises a collection of recognized text blocks, each with positional properties and recognized text.

Embodiments of the present disclosure utilize a tri-character gram approach that is referred to herein as TGF-IDF or tri-character gram frequency-inverse document frequency. Furthermore, the TGF-IDP vectors are weighted by weighting factors.

A tri-character gram is a set of three characters and represents the fundamental unit for calculating TGF-IDF metrics in the embodiments of the present disclosure. Thus, text associated with a recognized text block is converted to tri-character grams. This is accomplished by first padding the recognized text with a "space" character at the beginning and end of the text and then finding all the tri-character grams in the padded text.

For example, if the recognized text was "apple tree", the padded phrase would be created by placing a space at the beginning and end of the phrase to obtain: "#apple#tree#" where the '#' character represents a space. The tri-character grams in the recognized text would then be:

1. #ap
2. app
3. ppl
4. ple
5. le#
6. e#t
7. #tr
8. tre
9. ree
10. ee#

The tri-character grain frequency (TGF) for a document is defined as the count of how many times a tri-character gram, tg, appears in a document, d. In other words:

$$TGF(tg,d) = |\{tg|tg \in d\}| \quad (1)$$

Where |·| is the cardinality operator.

Inverse document frequency (Ian for tri-character grams is defined as the log of the total number of documents in the collection divided by the number of documents with the tri-character gram, tg. In other words:

$$IDF(tg) = \log \frac{|D|}{1 + |\{d \in D: tg \in d\}|}$$

The "plus 1" in the denominator is a numerical modification that avoids a divide by zero error. D is the set of all documents. The IDF is designed to capture how unique a tri-character gram is when considering the tri-character gram in light of all tri-character grams in a total document collection tri-character vocabulary, T. T represents the collection of all tri-character grams in a set of documents, D, and is also referred to as the tri-character gram vocabulary, or more simply, the vocabulary. When building a search index, or for a query using the search index, the set of all documents D is the set of documents from which the index is build (e.g., 404 of FIG. 4).

The TGF-IDF of a document is defined as the product of TGF and IDF for each tri-character gram. It is a vector with a dimensionality corresponding to the total number of tri-character grams in the vocabulary, T. The value of each dimension is TGF(tg, d)·IDF(tg), for all the tri-character grams, tg, in the vocabulary, T. Thus, the TGF-IDF for document d is given by:

$$TGF\text{-}IDF_d = \{TGF(tg_1,d) \cdot IDF(tg_1), \ldots, TGF(tg_T,d) \cdot IDF(tg_T)\} \quad (3)$$

Since generally a given document will have fewer tri-character grams than T, the TGF-IDF vectors are sparse in most instances, meaning a large percentage of the entries are zero. Since the TGF-IDF vectors are sparse, the retrieval of results from an index can be accelerated with an inverse index as explained below.

A document, however, is not simply a string of text terms, but a set of recognized text blocks. Thus, for a given document, the sum of the TGF-IDF for the individual recognized text blocks is obtained to gain the TGF-IDF for the entire document. Thus:

$$TGF\text{-}IDF_d = \Sigma_{i=1}^{N} TGF\text{-}IDF_i \quad (4)$$

Where $TGF\text{-}IDF_i$ is the TGF-IDF vector for the $i^{th}$ recognized block and N is the number of recognized text blocks in the document. Thus, $TGF\text{-}IDF_d$ is equivalent to a vector with each term is given by:

$$TGF(tg_j,d) \cdot IDF(tg_j) = \Sigma_{i=1}^{N} TGF(tg_j,i) \cdot IDF(tg_j) \quad (5)$$

Where $tg_j$ is the $j^{th}$ tri-character gram, $TGF(tg_j, i)$ is the TGF for the $i^{th}$ recognized text block and the $j^{th}$ tri-character gram and $IDF(tg_j)$ is the IDF for the $j^{th}$ tri-character gram.

A recognized block comprises both positional parameters and recognized text as previously described. As noted above, the recognized text is used to calculate a feature based on the tri-character grams, namely the TGF-IDF for the tri-character gram as explained above. Such a feature is useful and can be used as feature vectors in some embodiments. However, such an approach still discards the information represented in the positional parameters associated with each recognized text block. Further improvements can be made by utilizing the positional parameters.

Not all text blocks carry the same importance. Since text is meant to be read by humans, the designers and creators of documents, products, and other items are motivated to embed the importance of each piece of information in the appearance and location of the text. For example, bold and large fonts indicate an importance to the text block. Thus, titles and important information tend to be larger, have higher contrast to the background, be located in more prominent locations and so forth. Lists of ingredients, ancillary information, and/or other less important information tends to be set in smaller fonts, have less prominent locations, and so forth.

Prior art solutions discard this information by simply concatenating recognized text. The tri-character grain approach discussed above is an improvement over prior art solutions, but still discards the information in positional parameters. To take advantage of information in the positional parameters, the tri-character gram TGF-TDF can be modified by weighting the importance of the tri-character gram TGF-IDF as encoded in the positional parameters of the associated text. This results in a layout-aware feature from which layout-aware feature vectors are crafted. Thus, embodiments of the present disclosure take advantage of the information represented in the positional parameters by weighting TGF-IDF features with a weighting factor that takes into account one or more of font size, location in the image (e.g., on the product or page), font weight (e.g., whether a font is bold, normal, light, etc.), all of which can be calculated or estimated from the positional properties associated with recognized text. The following describes various subweight factors and how an overall weighting factor can be calculated from an aggregation of desired subweight factors.

The positional parameters are used to calculate a weighting factor for the block and the recognized text is used to create a feature vector for the block. Each feature of the feature vector is weighted by the weight factor for the block. The feature vector for a document comprises an aggregation of the block feature vectors as described below.

The following discusses how a font size subweight, a font weight subweight, a block location subweight can be calculated and aggregated to form a block weight. As noted above, in some embodiments the positional properties comprise the left coordinate of the block, $x_i$, the top coordinate of the block, $y_i$, the width of the block, $w_i$ and the height of the block, $h_i$. These can be used to calculate the various subweights and the subweights can be aggregated to yield a weighting factor for the block.

Calculation of a font size subweight contribution is based on the font size for a recognized block. The larger the font size, the more importance given to the block. The font size subweight is given as:

$$sw_i = \frac{size_i^{\lambda_s}}{\sum_i size_i^{\lambda_s}} \quad (6)$$

Where: $sw_i$ is the font size subweight contribution.
$size_i$ is the estimated font size for the $i^{th}$ block.
$\lambda_s$ is a tunable parameter.

In a representative embodiment, $\lambda_s$ has a value of 1.0. The size of the $i^{th}$ block, $size_i$ is estimated by the line height of the block. Thus:

$$size_i = \frac{h_i}{n} \quad (7)$$

Where, $h_i$ is the height of the block from the positional parameters and n is the number of lines of text in the block.

The calculation of a font weight subweight contribution takes into consideration whether the font size is bold, not bold, and so forth. Blocks that have bold characters are given more importance than those that are not. The font weight subweight is given as:

$$fw_i = \frac{weight_i^{\lambda_w}}{\sum_i weight_i^{\lambda_w}} \quad (8)$$

Where: $fw_i$ is the font weight subweight contribution.
$weight_i$ is the estimated font weight for the $i^{th}$ block.
$\lambda_w$ is a tunable parameter.

In a representative embodiment, $\lambda_w$ has a value of 0.1. The font weight of the $i^{th}$ block, $weight_i$, is estimated using the average width per character in the block. Thus:

$$weight_i = \frac{w_i}{m} \quad (9)$$

Where, $w_i$ is the width of the block from the positional parameters and m is the number of characters in a line of text in the block.

The calculation of a block distance subweight contribution takes into consideration where the block is positioned on the page. Blocks that are in the center of the image are given more weight than blocks that are toward the edges of the image. The block distance subweight is given as:

$$dw_i = \frac{N(d_i^{\lambda_d} \mid 0, \sigma)}{\sum_i N(d_i^{\lambda_d} \mid 0, \sigma)} \quad (10)$$

Where: $dw_i$ is the block distance subweight contribution.
$d_i$ is the distance from the block center to the image center. This can be calculated from the image center and the block positional parameters as one of skill in the art would easily understand.
$\lambda_d$ is a tunable parameter.
$N(d_i^{\lambda_d}|0\sigma)$ is a normal distribution with zero mean and standard deviation $\sigma$ evaluated at $d_i^{\lambda_d}$.

In a representative embodiment, $\lambda_d$ has a value of 0.1 and $\sigma$ has a value of 1.

The overall weight for the block, $W_i$, is given by the product of one or more of the subweights. In one embodiment, the overall weight is the product of all three subweights, although other embodiments may utilize fewer than all of the subweights. Thus, if all the subweights are used:

$$W_i = sw_i \cdot fw_i \cdot dw_i \quad (11)$$

For embodiments that use fewer than all the subweights, the product of the selected subweights is used.

The weighting factor, $W_i$, is applied to a feature vector of a recognized block of a document. Thus, for a document, the feature vector is given by equation (3) above where each term in the feature vector is modified to be the weighted sum of the tri-character gram TGF-IDF for the individual blocks. Thus, the individual terms in the feature vector for a document are thus given by:

$$TGF(tg_j, d) \cdot IDF(tg_j) = \sum_{i=1}^{N} W_i TGF(tg_j, b_i) \cdot IDF(tg_j) \quad (12)$$

Where $W_i$ is given by equation (11) (or by a desired product of subweight terms if less than all the subweights are used), $b_i$ is the $i^{th}$ recognized block.

The feature vector for a query image is calculated in the same way, since the query is just a document. Thus, the individual terms in the feature vector for a query document, q, are given by:

$$TGF(tg_j, q) \cdot IDF(tg_j) = \sum_{i=1}^{N} W_i TGF(tg_j, b_i) \cdot IDF(tg_j) \quad (13)$$

FIG. 6 illustrates a representative flow diagram 600 for feature extraction according to some aspects of the present disclosure. This flow diagram describes how to create a location-aware feature vector from recognized OCR blocks that have positional parameters and recognized text for a document. The document can be a document from which an index is built (e.g., 404, 408) a query document from which a location-aware feature vector is extracted (e.g., 204/304, 208/308), or a document from which a trigger model is trained (e.g., 504, 508), or any other document/image.

The process begins at operation 602 and proceeds to operation 604 which begins a loop for each recognized text block in the document. Operation 606 extracts the tri-character grams from the recognized text for the recognized block under consideration (e.g., block tri-character grams).

Using the example above, if the recognized phrase was "apple tree" the tri-character grams would be extracted as:
1. #ap
2. app
3. ppl
4. ple
5. le#
6. e#t
7. #tr
8. tre
9. ree
10. ee#

The weighting factor, $W_i$, is then created for the block in operation 608. Equations (6)-(11) above describe how $W_i$ is then created. If not all the weighting subweights are used to create $W_i$, equation (11) is modified to include only the product of the weighting factors that will be used to create $W_i$ as explained.

Operation 610 begins a loop to create a location aware feature vector term for the tri-character grams in the recognized block. For each tri-character gram (i.e., that was extracted by operation 606) operation 612 creates the weighted TGF-IDF according to:

$$TGF(tg_j, b_i) \cdot IDF(tg_j) = W_i TGF(tg_j, i) \cdot IDF(tg_j) \qquad (14)$$

Where $b_i$ is the $i^{th}$ recognized block, meaning the block under consideration in the current iteration of the loop, and $tg_j$ is the $j^{th}$ tri-character gram under consideration in the loop. The loop for the tri-character grains of the $i^{th}$ recognized block ends at operation 614 and the resultant output is a location-aware feature vector for the $i^{th}$ recognized block. For example, if the text associated with the recognized text block was "apple tree", the vector would have ten entries corresponding to the ten tri-character grams above:

$$\{W_i TGF\text{-}IDF_1, W_i TGF\text{-}IDF_2, \ldots, W_i TGF\text{-}IDF_{10}\}$$

Where $TGF\text{-}IDF_j$ is the TGF-IDF for the $j^{th}$ tri-character gram above and $W_i$ is the weighting factor for the block.

Operation 616 aggregates the weighted TGF-IDF for the tri-character grams with those of prior calculated recognized blocks. The loop over all the recognized blocks ends at operation 618 and the process ends at operation 620.

FIG. 7 illustrates a representative diagram showing an example of creating a location-aware feature vector for a document according to some aspects of the present disclosure. This diagram shows how the flow diagram of FIG. 6 works in a representative example.

Suppose a document has two recognized blocks, $Block_1$ 702 and $Block_2$ 704. Operation 606 of FIG. 6 extracts five tri-character grams for the recognized text of $Block_1$ 702, which include $\{tg_1, \ldots, tg_5\}$. Operation 606 of FIG. 6 calculates the weighting factor for $Block_1$ 702 as $W_1$. The loop of operations 610, 612, and 614 calculates the weighted TGF-IDF for each term in the vector $\{tg_1, \ldots, tg_5\}$, which is represented in FIG. 7 as the vector $\{W_1 X_1, \ldots, W_1 X_5\}$ 708, where $X_k$ is the TGF-IDF for the $k^{th}$ tri-character gram, $tg_k$. The aggregation in operation 616 after the first pass through the loop 610, 612, 164 adds the vector 708 to an empty vector and thus the vector 708 also represents the location-aware feature vector after the first pass through the loop.

The loop ending with operation 618 next considers $Block_2$ 704. Operation 606 extracts five tri-character grains for the recognized text of $Block_2$ 704, which include $\{tg_2, tg_4, tg_6, tg_7, tg_8\}$ for this example. Operation 608 calculates the weighting factor for $Block_2$ 704 as $W_2$. The loop of operations 610, 612, and 614 calculates the weighted TGF-IDF for each term in the vector $\{tg_2, tg_4, tg_6, tg_7, tg_8\}$, which is represented in FIG. 7 as the vector $\{W_2 X_2, W_2 X_4, W_2 X_6, W_2 X_7, W_2 X_8\}$ 710, where $X_k$ is the TGF-IDF for the $k^{th}$ tri-character gram, $tg_k$. The aggregation in operation 616 adds the vector 710 to the aggregated vector so far (which is vector 708) which results in the vector $\{W_1 X_1, (W_1+W_2) X_2, W_1 X_3, (W_1+W_2) X_4, W_1 X_5, W_2 X_6, W_2 X_7, W_2 X_8\}$ 712. The loop ends at 618 and since there are no more blocks, the process ends at 620.

This process gives the non-zero entries for the location-aware feature vectors for a document. When building a search index such as index 414 of FIG. 4, the location-aware feature vectors for each document can be augmented so that tri-character grams that are in the vocabulary, T, are added to the location-aware feature vector as zero entries. Thus, the index of location-aware feature vectors comprises a location-aware feature vector of dimensionality |T|, which is the number of tri-character grams in the vocabulary, for each document represented in the index.

A location-aware feature vector can be extracted from a query document in the manner identified in FIG. 6 and flintier illustrated in the example of FIG. 7. Furthermore, location-aware feature vectors used to train a triggering model, such as illustrated in FIG. 5, can be augmented to include zero entries as described above, or can be unaugmented and contain only the non-zero entries.

Retrieval and Recognition Using a Feature Vector

While the feature vector containing the location-aware features can be directly plugged in existing retrieval systems, improvements can be made in some embodiments. In retrieval and recognition systems that use OCR as part of the process, there is usually a domain difference between the index and the query image. For example, as noted herein, the images used to create the index are taken under more ideal circumstances and utilize good lighting, good camera angles, careful focus, and so forth. However, the query images usually have cluttered background, imperfect lighting conditions, odd camera angles, shadows, and so forth. These differences lead to a domain difference, due to the less than perfect match between the images. On one hand OCR is effective approach to bridge the gap between these domains, on the other hand OCR has challenges because the OCR results would be inconsistent in such cases between query and database images due to misrecognition of words, characters, and so forth. Specifically, the OCR result from the query images usually have smaller number of words and more spelling errors. While the layout-aware feature can alleviate the problem, it cannot completely eliminate it. Modifications in the retrieval process will further improve results.

One change that can be made to further improve results is the normalization used on the document side (i.e., in the feature vectors of the index). In embodiments of the present disclosure, $L_\infty$, normalization is used on the feature vectors in the index. This represents a change from prior art solutions, which typically utilize $L_2$ normalization. $L_\infty$ normalization is defined as:

$$f' = \frac{f}{\|f\|_\infty} \qquad (15)$$

Figure 8:
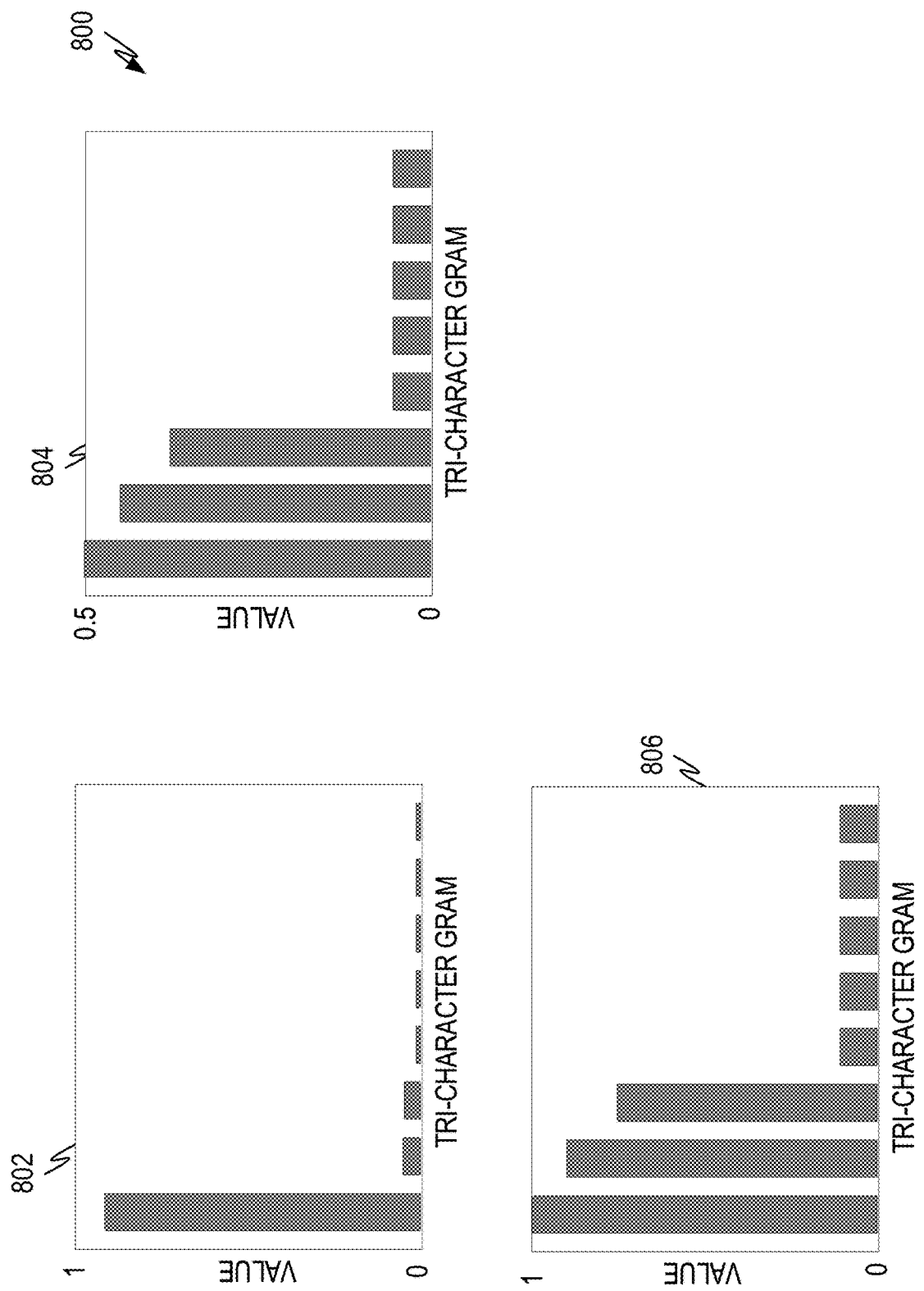
FIG. 8 illustrates representative feature vectors and normalizations according to some aspects of the present disclosure.

Here $\|f\|_\infty$ is the $\infty$-norm, which is defined as $\sqrt[\infty]{\Sigma_i f_i^\infty}$. In the limit, this is equivalent to dividing the features by the feature with the maximum value. This $L_\infty$ normalization design makes the retrieval engine more tolerant to partial matching. For example, an index entry created from an image of a book with a big title and small illustrative texts taken under more ideal conditions ends up with a layout-aware feature vector that looks something like chart 804 of FIG. 8 if $L_2$ normalization is used. If a user submits a photo of the same book taken by his/her camera, the layout-aware feature vector may look like chart 802 of FIG. 8, with only a few big words being captured.

A normal retrieval engine will take the dot product between these two feature vectors as represented in charts 802 and 804. In the illustrated case, the dot product would be low due to the imbalance of the terms and the difference in values of the terms. However, if $L_\infty$ normalization is used, index layout-aware feature vector would look like chart 806, due to the change in normalization scaling. The dot product between the query vector 802 and the index entry 806 is much greater due to the $L_\infty$ normalization.

The difference in $L_2$ normalization and $L_\infty$ normalization introduces a scaling change in the layout-aware features of the feature vectors. $L_2$ normalized features have a range of 0 to 0.5, while the $L_\infty$ has a range of 0 to 1. This results in the change in the dot product difference. Additionally, cosine similarity is a less than ideal choice for retrieval because it has an $L_2$ normalization embedded therein and would defeat the goal of $L_\infty$ normalization. Finally, the discussion here is independent of how the query feature is normalized. This is because query normalization does not change the relative order of the matching scores. Embodiments of the present disclosure continue to use $L_2$ here to penalize longer queries.

Since the layout-aware feature vectors are sparse, an inverted index benefits the retrieval process. In the index building phase (e.g., FIG. 4), for the calculated features $F=\{f_d\}_{d \in D}$, the system reorders the matrix in column-major (i.e. by tri-character gram tg instead of document d) and build a dictionary as the inverted index:

$$II(tg)=\{f_d(tg)|d \in D\} \quad (16)$$

Where $f_d(tg)$ is the $tg^{th}$ dimension of $f_d$. In the query stage, with the query feature $f_q$, the retrieval scores can then be efficiently calculated as:

$$S_d = \Sigma_{tg \in \{tg|f_q(tg) \ne 0\}} f_q(tg) \quad (17)$$

Because only limited number of entries (generally <100 in contrast with tens of thousands as vocabulary size) of the query features are non-zero, the summation can be calculated with much less effort compared with brute-force search. This makes the retrieval and recognition system extremely efficient and scalable. Then the aggregator (e.g., 216, 316) is able to re-rank the documents according to $S_d$, retrieve their corresponding metadata, and obtain the recognition result using strategies such as majority voting.

Experimental Results

Experiments were performed using a self-collected measurement set to ascertain the effectiveness of embodiments of the present disclosure. A reference implementation of a recognition system, such as that illustrated in FIG. 3, was made to recognize books. A book database having about 3 million books and 9 million images was collected. OCR and feature extraction was performed as described herein to create a search index and metadata database. An inverted index using $L_\infty$ normalization was created front the feature vectors. A set of query images was also collected and the feature vectors extracted as described herein. $L_2$ normalization was used for the feature vectors of the query image feature vectors.

A recognition was counted as correct if the recognized title from the index was the same as the title in the query image. The accuracy was calculated as the ratio of how many books were correctly recognized compared to the total number of recognition attempts. The experimental results achieved an 82% recognition accuracy. When the inverted index was recalculated using $L_2$ normalization, the recognition accuracy dropped to 69%. The latency of the recognition results for the reference implementation was around 200 ms per query, not including the OCR time.

To test the effectiveness of a two-stage triggering process, images other than books were obtained to construct a query set. False positive was used as the metric to test the triggering model effectiveness. A single stage triggering model using a trained deep neural network (DNN) achieved a 33% false positive rate. Implementing a two-stage triggering process reduced the false positive rate to 6%. For a business card data set, the two-stage triggering process reduced the false positive rate from 28% for the single stage DNN to 0% for the two-stage triggering process.

Example Machine Architecture and Machine-Readable Medium

Figure 9:
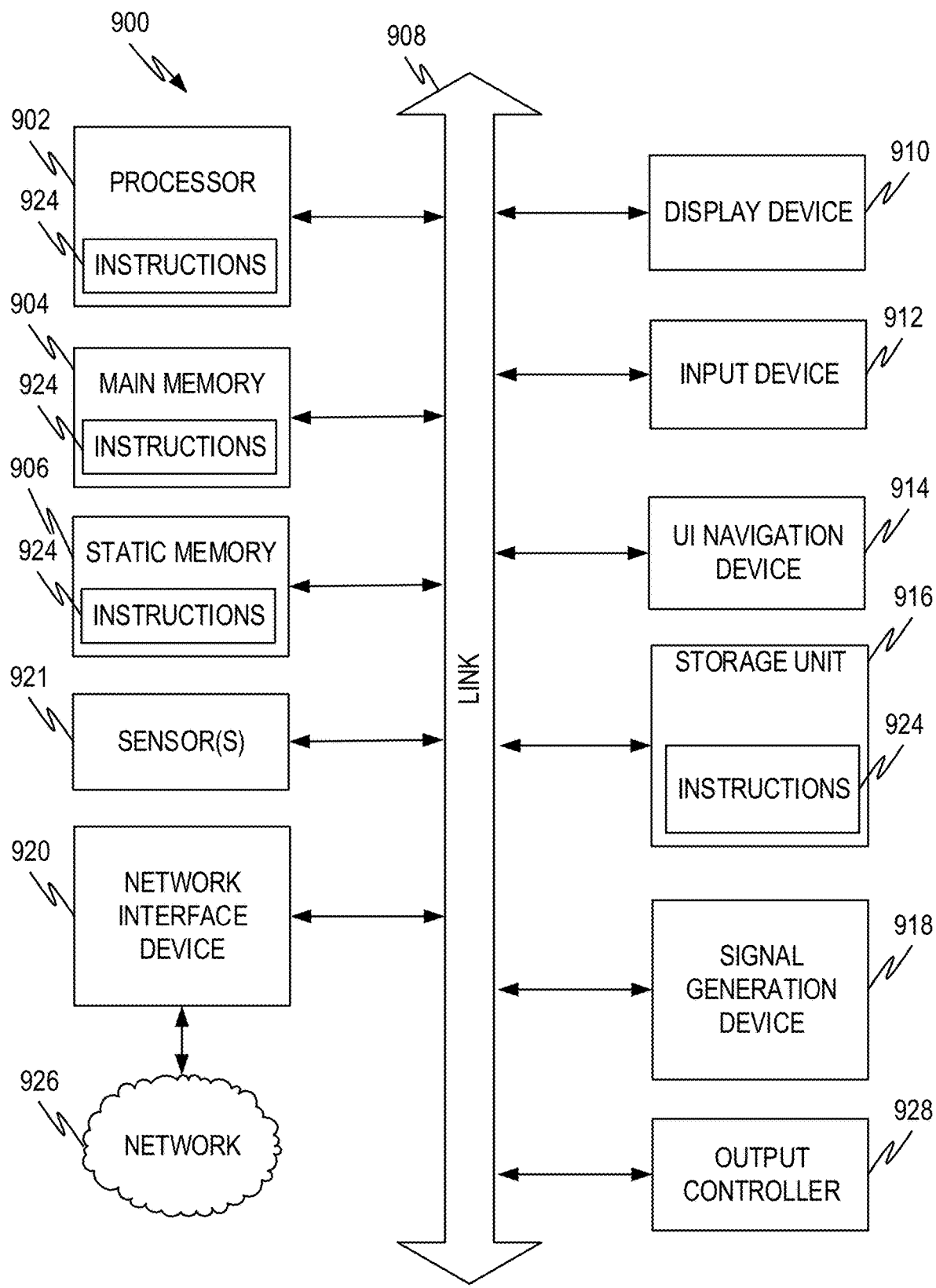
FIG. 9 illustrates a representative architecture for implementing the systems and other aspects disclosed herein or for executing the methods disclosed herein.

FIG. 9 illustrates a representative machine architecture suitable for implementing the systems and so forth or for executing the methods disclosed herein. The machine of FIG. 9 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), and so forth), output controller 928 (e.g., wired or wireless connection to connect and/or communicate with one or more other devices such as a universal serial bus (USB), near field communication (NFC), infrared UR), serial/parallel bus, etc.), and a network interface device 920 (e.g., wired and/or wireless) to connect to and/or communicate over one or more networks 926.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for visual recognition, comprising:
receiving an output of an optical character recognition process comprising one or more recognized blocks, each recognized block comprising a set of positional properties and recognized text;
creating a block weight from the set of positional properties for each of the recognized blocks;
creating a set of block tri-character grams for each recognized block based on the recognized text for that block;
creating a block tri-character gram feature vector based the set of block tri-character grams;
creating a block feature vector each recognized block from the weight and the block tri-character gram feature vector for the recognized block;
creating a feature vector based on an aggregation of the block feature vectors;
retrieving a set of results from an index based on the feature vector.

Example 2

The method of example 1 wherein the weight comprises an aggregation of subweights derived from the set of positional properties for the recognized block, the subweights comprising one or more of:
a subweight based on an estimated font size;
a subweight based on an estimated font weight; and
a subweight based on a location of the recognized block.

Example 3

The method of example 1 or 2 wherein the block feature vector is a vector of TGF-IDF features based on tri-character grams.

Example 4

The method of example 3 wherein each TGF-IDF feature for a tri-character gram is a product of a tri-character gram frequency for the tri-character gram multiplied by an inverse document frequency for the tri-character gram.

Example 5

The method of example 1, 2, 3, or 4 wherein the block feature vector for a recognized block comprises the weight for the recognized block multiplied by each entry in the tri-character gram feature vector.

Example 6

The method of example 1, 2, 3, 4, or 5 wherein entries in the index comprise document feature vectors based on tri-character grams of a corresponding document and wherein the document feature vectors are normalized by an co-norm.

Example 7

The method of example 1, 2, 3, 4, 5, or 6 wherein retrieving a set of results from an index based on the feature vector comprises:

calculating a document retrieval score for each of a plurality of entries in the index based on the feature vector and the plurality of entries in the index;

ranking the plurality of entries by their respective document retrieval scores;

adding to a candidate set of results those entries with a document retrieval score above a threshold; and selecting the set of results as a subset of the candidate set of results based on a selection criteria.

Example 8

The method of example 1, 2, 3, 4, 5, 6, or 7 wherein the index is an inverted index.

Example 9

The method of example 1, 2, 3, 4, 5, 6, 7, or 8 further comprising:

submitting the feature vector to a trained machine classifier; and wherein retrieving the set of results from an index based on the feature vector occurs responsive to the trained machine classifier classifying the feature vector into a designated category.

Example 10

The method of example 9 wherein the trained machine classifier is trained based on documents represented by entries in the index.

Example 11

A system comprising a processor and computer executable instructions, that when executed by the processor, cause the system to perform operations comprising:

receive an output of an optical character recognition process comprising one or more recognized blocks, each recognized block comprising a set of positional properties and recognized text;

create a block weight from the set of positional properties for each of the recognized blocks;

create a set of block tri-character grams for each recognized block based on the recognized text for that block;

create a block tri-character gram feature vector based the set of block tri-character grams;

create a block feature vector each recognized block from the weight and the block tri-character gram feature vector for the recognized block;

create a feature vector based on an aggregation of the block feature vectors;

retrieve a set of results from an index based on the feature vector.

Example 12

The system of example 11 wherein the weight comprises an aggregation of subweights derived from the set of positional properties for the recognized block, the subweights comprising one or more of:

a subweight based on an estimated font size;
a subweight based on an estimated font weight; and
a subweight based on a location of the recognized block.

Example 13

The system of example 11 or 12 wherein the block feature vector is a vector of TGF-IDF features based on tri-character grams.

Example 14

The system of example 13 wherein each TGF-IDP feature for a tri-character gram is a product of a tri-character gram frequency for the tri-character grain multiplied by an inverse document frequency for the tri-character gram.

Example 15

The system of example 11, 12, 13, or 14 wherein the block feature vector for a recognized block comprises the weight for the recognized block multiplied by each entry in the tri-character gram feature vector.

Example 16

The system of example 11, 12, 13, 14, or 15 wherein entries in the index comprise document feature vectors based on tri-character grams of a corresponding document and wherein the document feature vectors are normalized by the ∞-norm.

Example 17

The system of example 11, 12, 13, 14, 15, or 16 wherein retrieve a set of results from an index based on the feature vector comprises:

calculate a document retrieval score for each of a plurality of entries in the index based on the feature vector and the plurality of entries in the index;

rank the plurality of entries by their respective document retrieval scores;

add to a candidate set of results those entries with a document retrieval score above a threshold; and select the set of results as a subset of the candidate set of results based on a selection criteria.

Example 18

The system of example 11, 12, 13, 14, 15, 16, or 17 wherein the index is an inverted index.

Example 19

The system of example 11, 12, 13, 14, 15, 16, 17, or 18 further comprising:

submit the feature vector to a trained machine classifier; and wherein retrieving the set of results from an index based on the feature vector occurs responsive to the trained machine classifier classifying the feature vector into a designated category.

Example 20

A computer storage medium comprising executable instructions that, when executed by a processor of a machine, cause the machine to perform operations comprising:

receive an output of an optical character recognition process comprising one or more recognized blocks, each recognized block comprising a set of positional properties and recognized text;

create a block weight from the set of positional properties for each of the recognized blocks;

create a set of block tri-character grams for each recognized block based on the recognized text for that block;

create a block tri-character gram feature vector based the set of block tri-character grams;

create a block feature vector each recognized block from the weight and the block tri-character gram feature vector for the recognized block;

create a feature vector based on an aggregation of the block feature vectors;

retrieve a set of results from an index based on the feature vector.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for visual recognition, comprising:
   receiving an output of an optical character recognition process comprising a recognized block, the recognized block comprising a set of positional properties and recognized text;
   creating a block weight from the set of positional properties for the recognized block;
   creating a set of block tri-character grams for the recognized block based on the recognized text for the recognized block;
   creating a block tri-character gram feature vector based on the set of block tri-character grams;
   creating a block feature vector for the recognized block from the block weight and the block tri-character gram feature vector for the recognized block;
   creating a feature vector based on the block feature vector;
   retrieving a set of results from an index, wherein the index includes entries for documents, and further wherein the set of results is retrieved based on the feature vector; and
   submitting the feature vector to a trained machine classifier,
   wherein retrieving the set of results from the index based on the feature vector occurs responsive to the trained machine classifier classifying the feature vector into a designated category.

2. The method of claim 1, wherein the block weight comprises an aggregation of subweights derived from the set of positional properties for the recognized block, the subweights comprising one or more of:
   a subweight based on an estimated font size;
   a subweight based on an estimated font weight; or
   a subweight based on a location of the recognized block.

3. The method of claim 1, wherein the block feature vector is a vector of tri-character gram frequency-inverse document frequency (TGF-IDF) features based on tri-character grams.

4. The method of claim 3, wherein each TGF-IDF feature for a tri-character gram is a product of a tri-character gram frequency for the tri-character gram multiplied by an inverse document frequency for the tri-character gram.

5. The method of claim 1, wherein the block feature vector for the recognized block comprises the block weight for the recognized block multiplied by each entry of the block tri-character gram feature vector.

6. The method of claim 1, wherein the entries in the index comprise document feature vectors based on tri-character grams of a corresponding document, and wherein the document feature vectors are normalized by an $\infty$-norm.

7. The method of claim 1, wherein retrieving a set of results from the index based on the feature vector comprises:
   calculating a document retrieval score for each entry in the index based on the feature vector and the entries in the index;
   ranking the entries by their respective document retrieval scores;
   adding to a candidate set of results those entries with a document retrieval score above a threshold; and
   selecting the set of results as a subset of the candidate set of results based on a selection criteria.

8. The method of claim 1, wherein the index is an inverted index.

9. A method for visual recognition, comprising:
   receiving an output of an optical character recognition process comprising a recognized block, the recognized block comprising a set of positional properties and recognized text;
   creating a block weight from the set of positional properties for the recognized block;
   creating a set of block tri-character grams for the recognized block based on the recognized text for the recognized block;
   creating a block tri-character gram feature vector based on the set of block tri-character grams;
   creating a block feature vector for the recognized block from the block weight and the block tri-character gram feature vector for the recognized block;
   creating a feature vector based on the block feature vector;
   retrieving a set of results from an index, wherein the index includes entries for documents, and further wherein the set of results is retrieved based on the feature vector; and
   submitting the feature vector to a trained machine classifier, wherein the trained machine classifier is trained based on the documents represented by the entries in the index.

10. The method of claim 9, wherein the block feature vector is a vector of tri-character gram frequency-inverse document frequency (TGF-IDF) features based on tri-character grams.

11. The method of claim 9, wherein each TGF-IDF feature for a tri-character gram is a product of a tri-character gram frequency for the tri-character gram multiplied by an inverse document frequency for the tri-character gram.

12. The method of claim 9, wherein the block feature vector for the recognized block comprises the block weight for the recognized block multiplied by each entry of the block tri-character gram feature vector.

13. A system comprising a processor and computer executable instructions, that when executed by the processor, cause the system to perform operations comprising:

receive an output of an optical character recognition process comprising a recognized block, the recognized block comprising a set of positional properties and recognized text;

create a block weight from the set of positional properties for the recognized block;

create a set of block tri-character grams for the recognized block based on the recognized text for the recognized block;

create a block tri-character gram feature vector based on the set of block tri-character grams;

create a block feature vector for the recognized block from the block weight and the block tri-character gram feature vector for the recognized block;

create a feature vector based on the block feature vector;

retrieve a set of results from an index, wherein the index includes entries for documents, and further wherein the set of results is retrieved based on the feature vector; and submit the feature vector to a trained machine classifier, wherein retrieving the set of results from the index based on the feature vector occurs responsive to the trained machine classifier classifying the feature vector into a designated category.

14. The system of claim 13, wherein the block feature vector is a vector of tri-character gram frequency-inverse document frequency (TGF-IDF) features based on tri-character grams.

15. The system of claim 14, wherein each TGF-IDF feature for a tri-character gram is a product of a tri-character gram frequency for the tri-character gram multiplied by an inverse document frequency for the tri-character gram.

16. The system of claim 13, wherein the block feature vector for the recognized block comprises the block weight for the recognized block multiplied by each entry of the block tri-character gram feature vector.

17. The system of claim 13, wherein the entries in the index comprise document feature vectors based on tri-character grams of a corresponding document, and wherein the document feature vectors are normalized by an ∞-norm.

18. The system of claim 13, wherein retrieve the set of results from the index based on the feature vector comprises:

calculate a document retrieval score for each entry in the index based on the feature vector and the entries in the index;

rank the entries by their respective document retrieval scores;

add to a candidate set of results those entries with a document retrieval score above a threshold; and select the set of results as a subset of the candidate set of results based on a selection criteria.

19. The system of claim 13, wherein the index is an inverted index.

20. The system of claim 13, wherein the block weight comprises an aggregation of subweights derived from the set of positional properties for the recognized block, the subweights comprising one or more of:

a subweight based on an estimated font size;

a subweight based on an estimated font weight; or a subweight based on a location of the recognized block.

* * * * *